United States Patent
Bennett et al.

(10) Patent No.: US 8,172,998 B2
(45) Date of Patent: May 8, 2012

(54) IONIC SOLVENTS USED IN IONIC POLYMER TRANSDUCERS, SENSORS AND ACTUATORS

(75) Inventors: Matthew Bennett, Blacksburg, VA (US); Donald Leo, Blacksburg, VA (US); Gordon Wallace, Wollongong (AU); Geoff Spinks, Balgownie (AU)

(73) Assignees: Virginia Tech Intellectual Properties, Inc., Blacksburg, VA (US); University of Wollongong, New South Wales (AU)

(*) Notice: Subject to any disclaimer, the term of this patent is extended or adjusted under 35 U.S.C. 154(b) by 2582 days.

(21) Appl. No.: 10/921,347

(22) Filed: Aug. 19, 2004

(65) Prior Publication Data

US 2005/0103706 A1 May 19, 2005

Related U.S. Application Data

(60) Provisional application No. 60/496,685, filed on Aug. 21, 2003.

(51) Int. Cl.
*G01N 27/00* (2006.01)

(52) U.S. Cl. .......................... 204/415; 204/400

(58) Field of Classification Search .............. 429/12, 429/30; 204/415, 400
See application file for complete search history.

(56) References Cited

U.S. PATENT DOCUMENTS

| | | | | |
|---|---|---|---|---|
| 4,959,132 A * | 9/1990 | Fedkiw, Jr. | | 205/344 |
| 5,136,474 A * | 8/1992 | Sarangapani et al. | | 361/502 |
| 5,250,167 A | 10/1993 | Adolf et al. | | |
| 5,268,082 A | 12/1993 | Oguro et al. | | |
| 5,827,602 A | 10/1998 | Koch et al. | | |
| 6,109,852 A | 8/2000 | Shahinpoor et al. | | |
| 6,475,639 B2 | 11/2002 | Shahinpoor et al. | | |
| 6,673,127 B1 * | 1/2004 | Allen et al. | | 29/623.1 |
| 6,828,062 B2 * | 12/2004 | Lu et al. | | 429/213 |
| 2005/0069780 A1 * | 3/2005 | Kinouchi et al. | | 429/317 |

OTHER PUBLICATIONS

Bennett, M.D., et al., "Ionic Liquids as Hyper-Stable Solvents for Ionic Polymer Transducers", Proc IMECE '03, 9 pgs, (2003).

* cited by examiner

*Primary Examiner* — Harry D Wilkins, III
*Assistant Examiner* — Zulmariam Mendez
(74) *Attorney, Agent, or Firm* — Whitham Curtis Christofferson & Cook, PC (57) ABSTRACT

Ionic liquids are incorporated into transducers, actuators or sensors which employ the ionic polymer membranes. The ionic liquids have superior electrochemical stability, low viscosity and low vapor pressure. The transducers, actuators and sensors which utilize ionic polymer membranes solvated with ionic liquids have long term air stability. Superior results are achieved when a conductive powder and ionomer mixture is applied to the ionic polymer membrane to form the electrodes during or after the ionic liquid is imbibed into the ionic polymer membrane.

8 Claims, 7 Drawing Sheets

IONIC SOLVENTS USED IN IONIC POLYMER TRANSDUCERS, SENSORS AND ACTUATORS

CROSS-REFERENCE TO RELATED APPLICATIONS

This application claims priority to U.S. Provisional Application 60/496,685 filed Aug. 21, 2003, and the complete contents thereof are incorporated by reference.

This invention was made using finding from the National Science Foundation, Grant Number CMS0070042, and the U.S. government may have certain rights in the application.

BACKGROUND OF THE INVENTION

1. Field of the Invention

The present invention generally relates to ionic polymer transducers, sensors and actuators.

2. Description of the Prior Art

Ionic polymers membranes are materials that behave as solid-state electrolytes, making them useful in a variety of applications, including fuel cells, water electrolyzers, transducers, actuators and sensors. Ionic polymer membrane actuators have existed in their current state since the early 1990s. See, for example, Sadeghipour, K., Salomon, R., and Neogi, S., 1992. "Development of a Novel Electrochemically Active Membrane and 'Smart' Material Based Vibration Sensor/Damper." *Smart Materials and Structures,* 1, pp. 172-179; Oguro, K., Kawami, Y., and Takenaka, H., 1992. "Bending of an Ion-Conducting Polymer Film-Electrode Composite by an Electric Stimulus at Low Volage." *Journal of Micromachine Society,* 5, pp. 27-30.; and U.S. Pat. Nos. 5,268,082 to Oguro, 6,109,852 to Shahinpoor, and 6,475,639 to Shahinpoor, each of which are herein incorporated by reference. These devices are often based on a perfluorosulfonic or percarboxylic acid membrane backbone with charged side groups. The addition of these charged groups allows the polymer membrane to conduct counterions and thus serve as a polymer electrolyte. This property also allows the polymer membrane to behave as a distributed actuator or sensor due to the redistribution of the cations within the polymer under the application of an electric field or when a stress is applied to the membrane.

In order for this phenomenon to occur, two conditions must be met. First, the cations must be free to move about within the polymer matrix. This is done by saturating the polymer with a solvent. The solvent of choice prior to this invention was water; however, U.S. Pat. No. 5,268,082 discusses the use of salt water and physiologic salt water and indicates that displacement with salt water is smaller than when operated in pure water. The solvent dissolves the cations associated with the pendant acidic groups and allows them to move within the polymer. Second, the surfaces of the membrane must be made to conduct electricity. This is accomplished by depositing a thin metal electrode on both surfaces of the membrane.

Typically, the ion exchange properties of the polymer are used to facilitate the deposition of the metal. The polymer is pretreated by sandblasting, hydrating, and cleaning in a strong acid. This acid wash also serves to ensure that the polymer is fully saturated with protons. The membrane is then placed into an aqueous solution containing ions of the metal to be plated. These ions are allowed to exchange with the protons in the polymer for a predetermined amount of time and are then reduced to their neutral state at the surface of the polymer by a reducing agent (typically $NaBH_4$ or $LiBH_4$). In this solvated and electroded form, the ionic polymer membrane can be made to bend towards the anode side when a small electric field (1-5 V) is applied across its thickness, thus making it a soft, distributed actuator. These membranes in this form can also be used as distributed sensors since the transient voltage generated across the membrane is correlated to the quasi-static displacement of the membrane. More recently, Newbury and Leo have shown that the charge generated at the surfaces of the membrane is proportional to the strain in the material (see, Newbury, K. and Leo, D. J., 2002, "Electromechanical Modeling and Characterization of Ionic Polymer Benders." *Journal of Intelligent Material Systems and Structures,* 13(1), pp. 51-60).

Ionic polymer membrane actuators have several advantages over other types of actuation technology. For example, because they are soft and saturated with water, they are amenable to implantation in the human body and therefore have significant potential in biomedical applications. Also, as compared to other many types of smart materials, these actuators generate larger strains (>1%) and strain rates at lower applied potentials (<10 kV/m) than over types of electroactive devices based on the piezoelectric or electrostrictive effect.

However, there are some key limitations to currently available ionic polymer membrane technology that has prevented it from experiencing widespread use. One of the most problematic limitations is the dependence of ionic polymer transducers on a solvent in order to function. As noted above, pure water (and sometimes salt water or physiologic water) is used as the solvent, but because the water will quickly evaporate in air, the applications for these devices are limited by its use. Also, the water will decompose into hydrogen and oxygen gas once the electrolysis voltage limit is reached (around 1 V). This decomposition will also contribute to rapid loss of the water and a corresponding drop in the performance of the polymer transducer.

One way around this problem would be to use a barrier coating to contain the water inside the membrane. Bar-Cohen et al reported that with the aid of a barrier coating they were able to operate a sample in air for four months (see, Bar-Cohen, Y., Leary, S., Shahinpoor, M., Harrison, J., and Smith, J., 1999, "Flexible Low-Mass Devices and Mechanisms Actuated by Electroactive Polymers" in EAP Actuators and Devices. SPIE, vol. 3669, pp. 51-56, and Bar-Cohen, Y., Leary, S., Shahinpoor, M., Harrison, J. O., and Smith, J., 1999. "Electro-Active Polymer (EAP) Actuators for Planetary Applications" in EAP Actuators and Devices. SPIE, vol.3669, pp.57-63). However, such a barrier coating will add passive stiffness to the actuator device and reduce the amount of strain that the device can generate. Furthermore, if the electrolysis limit of the aqueous solvent is exceeded, the formation of hydrogen and oxygen gases at the membrane surfaces will create blisters beneath the barrier coating and lead to de-lamination of this coating from the polymer transducer.

Although most of the work in the area of ionic polymer transducers has focused on water as the solvent, there have been a limited number of studies on the use of alternative solvents. For example, Nemat-Nasser has demonstrated the use of ethylene glycol and glycerol as suitable solvents for these materials (see, Nemat-Nasser, S., 2002. "Micromechanics of Actuation of Ionic Polymer-metal Composites" *Journal of Applied Physics,* 92(5), pp. 2899-2915, and Nemat-Nasser, S., 2003. "Experimental Study of Nafion-and Flemion-based Ionic Polymer-Metal Composites (IPMCs) with Ethylene Glycol as Solvent" in EAP Actuators and Devices. SPIE). These materials do not suffer from the dehydration problem associated with water, but the speed of the actuation mechanism in the transducers is reduced significantly. Also, Shahinpoor and Kim have demonstrated that composites of poly(ethylene oxide) and poly(ethylene glycol) will exhibit electromechanical behavior under an applied electric field with no aqueous solvent necessary (see, Shahinpoor, M. and Kim, K., 2001. "Fully Dry Solid-State Artificial Muscles Exhibiting Giant Electromechanical Effets" in EAP Actuators and Devices. SPIE, pp. 428-435, and Shahinpoor, M. and Kim, K., 2002. "Solid-State Soft Actuator Exhibiting Large Electromechanical Effect" *Applied Physics Letters*, 80(18), pp. 3445-3447). In these materials, the very low molecular weight poly(ethylene glycol) essentially serves as the solvent, creating soft amorphous phases in the composite polymer that facilitate motion of the cations.

SUMMARY OF THE INVENTION

It is therefore an object of the present invention to provide ionic polymer transducers, actuators and/or sensors that utilize ionic liquids as hyper-stable solvents.

According to the invention, ionic liquids have been demonstrated as viable solvents for ionic polymer transducers, actuators and/or sensors. These new solvents overcome some of the key limitations of using water as a solvent with these devices, including evaporative loss of the solvent when operating in an air environment and low electrochemical stability of the solvent. A comparison of ionic polymer transducers solvated with water and ionic liquid has been made and important differences in the responses of these transducers have been identified. The results showed that transducers, actuators and/or sensors made using ionic liquids as solvents have a much more stable response when operated in air than do the same materials solvated with water. Also, cyclic voltammetry demonstrated that much higher voltages can be applied to the ionic liquids before solvent breakdown.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

Figure 1:
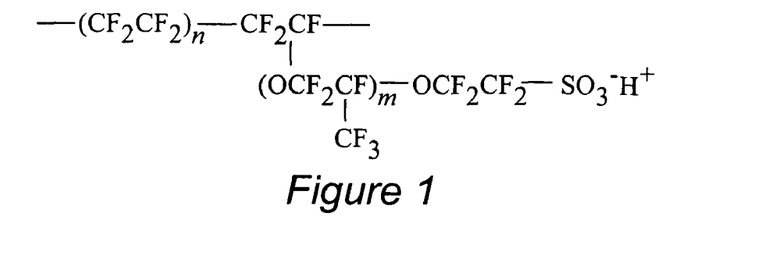
FIG. 1 shows the chemical structure of an exemplary perfluorosulfonic membrane material commonly referred to as Nafion.

This invention contemplates the use of ionic liquids as solvents for ionic polymer actuators and transducers. Suitable ionic liquids will have a low vapor pressure and a large electrochemical stability window. Additional benefits may be realized from solvents that have a high ionic conductivity. The ionic polymers or ionomers employed by this invention are able to conduct ions by virtue of the fact that they contain ionic groups bound to the polymer chains. These materials are characterized by having one type of ion (either anion or cation) covalently bonded to the polymer chain with the other ion being ionically bound. When the material is soaked with a solvent the ionic bond is disrupted and one of the ions (either the cation or anion depending on the type of polymer) becomes free to move about within the polymer matrix. A common type of ionomer is Nafion. The chemical structure of Nafion is shown in FIG. 1. There exist many other types of ionomer membranes as well, including perfluorocarboxylic acid membranes, sulfonated poly(arylene ether sulfone), sulfonated poly(arylene thioether sulfone), sulfonated poly (ether ketone ketone), sulfonated polystyrene, and sulfonated polybutadiene.

Figure 2A:
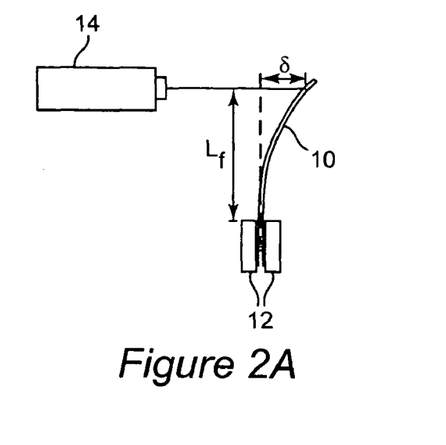
FIGS. 2a and 2b shows schematic diagrams of an experimental set up used to measure the free strain generated by the transducer as an actuator, and the modulus and sensing response of the transducer, respectively.
Figure 2B:
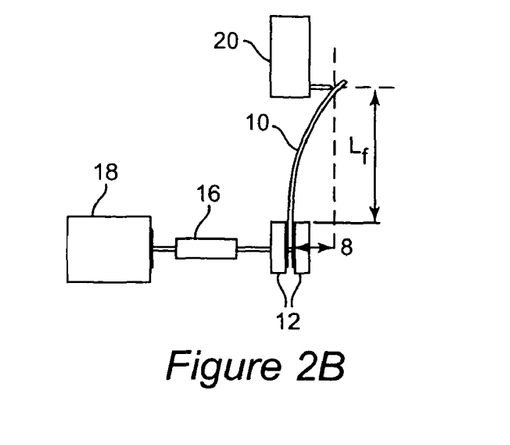

FIGS. 2a and 2b show an ionic polymer membrane 10 (e.g., a perfluorosulfonic acid membrane such as Nafion or a perfluorocarboxylic acid membrane such as Flemion) having electrodes 12 positioned on opposite sides thereof. In the present invention, the ionic polymer membrane 10 is impregnated with an ionic liquid. The generalized configuration can function as an actuator (FIG. 2a) where current passing between the electrodes causes the ionic polymer membrane to flex. Similarly, the generalized configuration can function as a transducer or sensor (FIG. 2b) where the flexing of the polymer membrane 10 caused by an applied force results in the development of an electric field and charge flow between the electrodes 12. The polymer membrane 10 can be constructed from a variety of materials, with the chief requirement being that the counterions that neutralize the charged side groups are free to move about within the polymer matrix. The polymer membrane 10 functions as a polymer electrolyte whereby the cations within the polymer redistribute when an electric field is imposed (the actuator of FIG. 2a) or when a stress is applied to the membrane (the transducer or sensor of FIG. 2b).

In the practice of this invention, the shape and size of the ionic polymer membrane 10, as well as the nature of the electrodes and the shape, size and position of the electrodes on the ionic polymer membrane 10 can vary considerably and will depend on the application for which the invention is used. For example, this invention may be employed in a variety of applications similar to those discussed in U.S. Pat. Nos. 6,475,639 to Shahinpoor, 6,108,852 to Shahinpoor, and 5,268,082 to Oguro, each of which are herein incorporated by reference, including without limitation membrane grippers, three-dimensional membrane actuators, composite wing-flaps, robotic swimming structures, robotic fish, resonant flying machine, surgical tools, metering valves, bellows pumps, peristaltic pumps, microelectromechanical systems (MEMs), electromechanical relay switches, artificial smooth muscle actuators, artificial sphincter and ocular muscles, artificial ventricular or cardiac arrest muscles, continuous variable aperture mirrors and antenna dishes, linear actuators, slithering devices, soft parts orientators, incontinence assist devices, displacement sensor devices, pressure transducers for joints, and blood pressure, pulse rate and rhythm measurement devices.

Ionic liquids (sometimes known as "molten salts") are ionic compounds that exist in a liquid form at low temperature, without the need to be dissolved in a solvent. These compounds may be used as electrolytes and have the added benefit of low volatility over a wide range of operating conditions and increased electrochemical stability window as compared to water. This means that they can withstand higher voltages than most common solvents before solvent breakdown. Ionic liquids also have a very low vapor pressure, meaning that they do not evaporate easily, as some common solvents (e.g., water) will. Therefore, when an ionic liquid is used as the solvent for an ionic polymer membrane in the place of water as contemplated by this invention, the resulting device would have the benefit of a larger voltage range in which it can be driven, as well as a much reduced tendency towards loss of performance due to dehydration. The use of an ionic liquid also overcomes the requirement for a suitable barrier coating against solvent loss (although a barrier may still be employed in some applications of this invention). Thus, if an ionic liquid is used as the solvent in an ionic polymer membrane transducer instead of water, the applications for these devices could potentially be increased dramatically over the current state of the art.

In the practice of this invention, the preferred ionic liquids are salts that exist in their liquid state at room temperature. They preferably contain only charged species and are highly stable. They preferably have no measurable vapor pressure, electrochemical stability windows of 2-4 V or more (most preferably 4V or more), and are thermally stable to temperatures as high as 200° C. to 400° C. Furthermore, ionic liquids used in the practice of this invention preferably have high ionic conductivities and can be used as electrolytes for a variety of applications, including photoelectrochemical solar cells, electrochemical capacitors, conducting polymer actuators, and as replacements for organic solvents in many common reactions.

The low melting point of these compounds is due primarily to the bulky and cumbersome structure of the corresponding ions, which inhibits the formation of a crystalline solid. One of the advantages of ionic liquids are that they are non-volatile, and in fact have no measurable vapor pressure, meaning that they will not be lost to evaporation. Also, they are able to dissolve a wide range of organic and inorganic compounds, including some polymers and minerals. They are also non-flammable, have a high thermal stability, and have a high electrochemical stability. David Adam reports that "Compared to the 300 organic solvents commonly used in the chemical industry, there are over a trillion possible ionic liquids . . . " (See, "Ionic Liquids." Nature Science Update. URL: http://www.nature.com/nsu/000608/000608-15.html). These compounds can also be tailored to give properties desirable for specific applications.

Substituted imidazolium based ionic liquids are currently being studied as electrolytes for battery and capacitor applications and may be advantageously used as ionic liquids in the present invention. The advantages that they can offer these systems are high ionic conductivity, high electrochemical stability, non-flammability, and non-volatility. These substituted imidazolium based ionic liquids may advantageously be employed in the actuators, transducers, and fuel cells of the present invention. U.S. Pat. No. 5,827,602 to Koch, which is herein incorporated by reference, describes a variety of hydrophobic ionic liquids which may be used as the ionic liquid in the practice of this invention including substituted or unsubstituted pyridinium compounds, pyridazinium compounds, pyrimidinium compounds, pyrazonium compounds, imadazolium compounds, pyrazolium compounds, thiazolium compounds, oxazolium compounds, and triazolium compounds. Ionic liquids have also been used as electrolytes for conducting polymer actuator systems, and would have many of the same advantages in the present invention. Conducting polymers are different than the ionic polymers of the present invention in that conducting polymers do not contain a bound ionic species, but rather are doped with an electrolyte. Also, the fundamental transduction mechanism in conducting polymers involves the transport of ions in and out of the polymer from or to a surrounding electrolyte, which gives rise to their slow speed as compared to ionic polymer actuators, in which the ion transport occurs within the polymer. As a result, conducting polymer actuators typically have slow response times as compared to ionic polymer-based actuators.

Lu et al. found that polypyrrole and polyaniline conducting polymer actuators operated in 1-butyl-3-methlyimidazolium tetrafluoroborate and 1-butyl-3-methlyimidazolium hexafluorophosphate ionic liquids exhibited larger induced strains, less polymer degradation, and less electrolyte degradation than the same polymers operated in aqueous or organic (propylene carbonate) electrolytes (see, Lu, W., Fadeev, A. G., Qi, B., Smela, E., Mattes, B. R., Ding, J., Spinks, G. M., Mazurkiewicz, J., Zhou, D., Wallace, G. G., MacFarlane, D. R., Forsyth, S. A., and Forsyth, M., 2002, "Use of Ionic Liquids for p-Conjugated Polymer Electrochemical Devices" Science, 297, pp. 983-987). The use of ionic liquids as electrolytes for conducting polymer actuators also allows for the application of higher voltages due to the increased electrochemical stability of the ionic liquids as compared to the water and propylene carbonate electrolytes. The use of ionic liquids in ionic polymer transducers, sensors, and actuators will also allow for the application of higher voltages as compared to the use of water.

Ionic polymer transducers can be made by depositing an interpenetrating platinum or gold electrode onto each side of a Nafion-117 (nominal thickness 183 microns) membrane. This deposition is performed by first saturating the membrane with Pt(NH3)4 2+ ions from a tetraammine-platinum chloride solution. The adsorbed ions are then reduced to platinum metal by soaking the membrane in a solution of sodium borohydride. This process results in a surface platinum electrode that penetrates into the membrane up to a depth of several microns. Penetration of the electrode can be enhanced by repeating the electroding process several times. This process may be done in aqueous solutions with the membrane in a water-saturated state. However, in the current invention, if aqueous solutions are used during formation of electrodes, a solvent exchange following the electroding process is necessary to incorporate the ionic liquid into the membrane.

Nafion based polymer transducers have been made previously using a platinum/copper co-reduction process followed by electroless gold plating (see, for example, Bennett, M. D. and Leo, D. J., 2003. "Manufacture and Characterization of Ionic Polymer Transducers Employing Non-Precious Metal Electrodes" *Smart Materials and Structures,* 12, pp. 424-436). These samples are then dried under heat and vacuum. An ionic liquid is then introduced into the sample by immersing the sample in a mixture of the ionic liquid (60% vol.) and methanol and sonicating the mixture at 65-75EC for 1-3 hours. This process is effective at imbibing the ionic liquid into the membrane, but can result in damage to the metal electrodes. Further study showed that the ionic liquid could be incorporated into the membrane by simple heating, although the process was much slower. However, the conductivity of the metal electrodes was often compromised during this process and the copper in the electrodes was dissolved by the ionic liquid. The cause of this loss of conductivity was eventually found to be the large dimensional variations in the film during processing. When the plated and water-solvated transducers are dried and then re-solvated with the ionic liquid, the resulting stress in the electrodes can cause increases in the surface conductivity of more than six orders of magnitude, effectively eliminating the electromechanical response of the transducer.

In order to overcome this problem, a novel plating method which is preferred in the practice of this invention uses a co-solvent of water and methanol or ethanol. In this process, the electrodes are composed of only platinum and are deposited using the same concept of ion exchange and subsequent reduction. However, the addition of 25-50% (vol.) alcohol to the normally all-aqueous process results in increased swelling of the polymer during the electrode deposition. Because the initial size of the electrode is much larger, surface conductivity is maintained when the film is dried and re-swollen with the ionic liquid.

In fact, because the size of the membrane in the ionic liquid-swollen state is usually smaller than its as-plated size, the surface conductivity is often enhanced. The samples prepared for the study reported in Example 1 were plated with platinum using this new method; the method was repeated four times to increase the platinum penetration depth. Following the platinum deposition a thin layer of gold was electroplated onto the membrane to increase the surface conductivity. The membrane was then boiled in sulfuric acid to exchange it into the proton form and finally was soaked for three days in a pure water/methanol mixture to rinse out any non-associated protons and excess anions.

After plating, small strips 5 mm by 23 mm were cut from the parent sample. These strips were dried at 25 torr and 80° C. for 6 hours. The dry weight of the samples was then measured and they were placed into vials containing the ionic liquids to be studied and heated to 100° C. for 41 hours to incorporate the ionic liquids.

Another, plating method may improve the performance of the current invention even further. In this more preferred embodiment of the present invention, the conducting electrodes are applied to the membrane as a powder. This may be done, for example, by one of two methods. In the first method, a conductive powder, which may be a powder of metal, a conducting polymer, carbon nanotubes, or another material is mixed with a solution of an ionomer. The ionomer solution is comprised of an ionic polymer dissolved in a suitable volatile solvent, where the ionic polymer may be the same or different from that used in the ionic polymer membrane. A suitable thickener like glycerol is sometimes added to the conductive powder and ionomer solution. An amount of ionic liquid also may be added to the mixture. A bare ionomer membrane is prepared by incorporating a certain amount of ionic liquid into the membrane by a suitable means. This conductive powder/ionomer solution/ionic liquid mixture is then applied to each side of the ionic liquid-containing ionic polymer ("ionomer") membrane by brushing, dipping, spraying, or any other suitable means. The identity of the ionic polymer in the conductive powder/ionomer mixture and the ionic polymer in the membrane need not be the same. The application of the mixture to the membrane is typically done several times in order to increase the thickness of the electrode layer. Following the application of each layer, any volatile solvents in the electrode layer are removed by baking the samples under vacuum. After the electrode layers are applied and the solvents are removed the electrode layers may be intimately bonded to the polymer membrane by hot pressing or hot rolling. In this way, electrode layers can be made on ionic liquid-containing ionic polymer membranes such that the electrode layers are composed of conductive particles suspended in the ionomer matrix. This process therefore results in a very large electrode/polymer interfacial area, which is known to maximize the performance of ionic polymer transducers. A layer of platinum or some other appropriate metal may also be first deposited on the ionomer membrane using an impregnation/reduction process. This deposition may be followed by the drying of the membrane and incorporation of the ionic liquid and subsequent application Also possible is a variation of this metal powder deposition process in which the two electrode layers are cast separately of the membrane from a solution. In this embodiment of the invention, a conductive powder is mixed with a solution of an ionomer and an amount of ionic liquid and poured into a casting mold. The conductive powder may consist of a metal powder, a conductive polymer powder, carbon nanotubes, or any other appropriate powder of an electron-conducting material. Once the solution is poured into the mold any volatile solvents are removed by evaporation. Annealing after solvent evaporation may also be employed to improve the layer morphology. An advantage of this casting approach is that it allows for improved control of the morphology of the electrode layer. Changes of the rate of evaporation of the volatile solvents can be easily affected by heating or cooling the electrode during curing. The speed with which the electrode cures will affect the dispersion of the conductive powder within the thickness of the electrode layer. Slower curing will result in more of the conductive particles being accumulated near one surface while faster curing will result in a more even distribution of the conductive particles within the electrode layer. Application of an electric field may also be used to control the arrangement of the conductive particles within the electrode layer. This will be particularly useful if carbon nanotubes are utilized in the electrode, as carbon nanotubes are known to align in an electric field. The application of an electric field around the electrode layer during curing will serve to align the conductive particles in a desirable way to maximize the performance of the resulting transducer, actuator and/or sensor.

After two such electrode layers have been fabricated by the above described casting procedure, the two electrode layers can be adhered to an ionomer membrane that has been previously incorporated with an ionic liquid by hot pressing or hot rolling. The advantage of the two described electrode deposition processes that utilize a conductive powder is that the ionic liquid is incorporated into the ionomer membrane prior to the application of the electrodes. Thus, these processes overcome the issue of the electrode degradation during the incorporation of the ionic liquid. Furthermore, these processes improve the control of the electrode layer morphology as compared to the impregnation/reduction process. After the interpenetrating conductive layer is deposited using a conductive powder, a second conductive surface layer is applied to improve the conductivity of the electrodes. This layer does not incorporate any of the ionic polymer and it can be any conductive material but is preferable a metal and is most preferably gold. This layer is deposited by using any appropriate technique that will not disturb the previously deposited layer, most preferable by sputter-coating.

The membranes electroded in this way are able to generate an applied strain when a voltage is applied, or generate a voltage when a strain is imposed (e.g., sensor applications). In order to impregnate these materials with ionic liquid, provided they are not already impregnated as discussed above in conjunction with the powder applied electrode embodiment described above, the first step after the plating process is to completely remove the water from the membranes. This may be done in the manner described above or by baking the samples in a vacuum oven, at a temperature of 70-80° C. and a pressure of 25 torr (absolute) for at least one hour. After dehydrating the polymer samples, they are placed into a mixture of 40% methanol (by weight) and 60% ionic liquid and sonicated at 65-75° C. for 1-3 hours. This technique has been proven effective in imbibing the ionic liquid into the ionic polymer membrane. The ionic liquid may also be incorporated by soaking the dry membranes in the neat ionic liquid with no alcohol at room temperature or at an elevated temperature and/or in the presence of a physical enhancement such as sonication.

Figure 3:
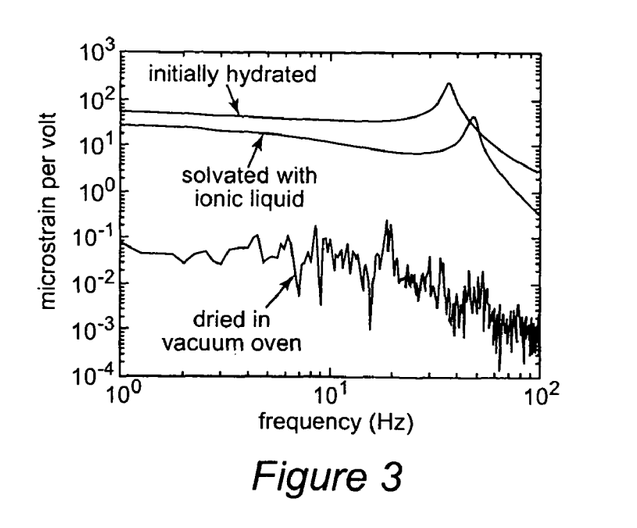
FIG. 3 is a graph showing the free strain response of an ionic polymer transducer that is saturated with water, that is dry, and that is saturated with an ionic liquid.

Examples of three ionic liquids which have been studied are composed of the 1-ethyl-3-methylimidazolium (EtMeIm) cation; the three anions investigated are bromide (Br), bis(trifluoromethanesulfonyl)imide (TFSI), and trifluoromethanesulfonate (TFMS). In order to evaluate the effectiveness of the ionic liquid as a solvent for these materials, the free strain response of a sample in both the water- and ionic liquid-solvated forms was measured, as shown in FIG. 3. The free strain frequency response is acquired by actuating the sample in a cantilever configuration and measuring the tip deflection with no imposed load using a laser vibrometer 14 (FIG. 2a). The sample is actuated with a random voltage signal and the input voltage and output displacement are fed into a Fourier analyzer, which calculates the frequency response between input voltage and free tip displacement. This free strain response is computed by using the geometry of the bender and assuming that the response is constant curvature.

For the result depicted in FIG. 2, the bromide derivative ionic liquid was used. As can be seen in the figure, the free strain generated in the actuator is decreased by about four orders of magnitude after dehydration, whereas after incorporation of the ionic liquid the free strain response recovers to about half of the response with the water solvent. Note that the very small response of the sample in the dehydrated state is likely due to a small amount of residual water inside the polymer; complete dehydration of the material is difficult to achieve.

Figure 4:
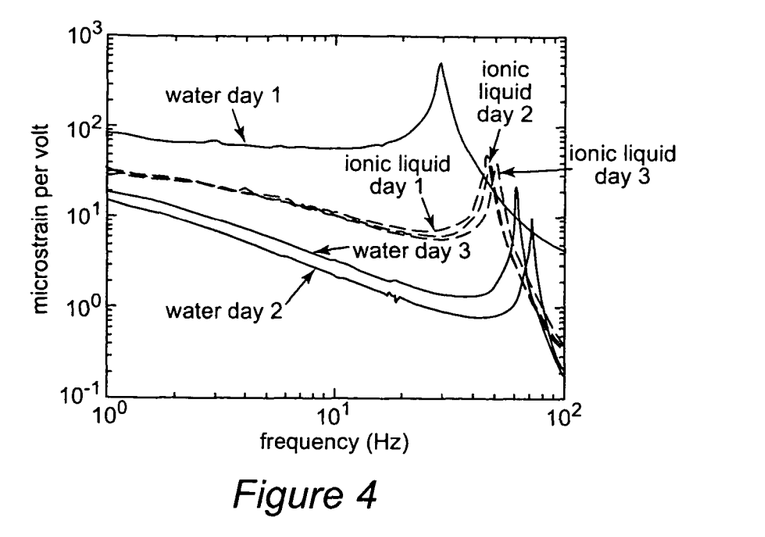
FIG. 4 is a graph showing the free strain responses of a water and ionic liquid solvated ionic polymer over three consecutive days.

The evaporative stability of the ionic liquid solvents has also been evaluated and compared to water. Two identical samples, one in the ionic liquid form (bromide anion) and one in the water form, were tested on consecutive days to determine the effect of leaving the samples exposed to ambient conditions, with no effort made to protect them from dehydration or other degradation As can be seen from FIG. 4, a dramatic difference in the responses from day one to day two is evident in the water-solvated sample. This is due to the evaporative loss of the water between the two tests. Further change in the response of the water-solvated sample is witnessed from day two to day three. The specific reason for this is unknown, but it may have been caused by changes in the relative humidity of the testing environment. Also, it should be noted that although this sample had lost most of the water solvent by the second day of testing, it was not completely dry. Rather, the water content inside the sample becomes equilibrated with the water content of the surrounding air, hence there is still a quantifiable amount of water inside the polymer and some electromechanical effect is still evident. By contrast, the sample that was dried in the vacuum oven is much drier and generates almost an unmeasurably small amount of strain (see FIG. 3). This is closer to the condition that such a device is likely to encounter if used for space applications.

The sample that was solvated with ionic liquid did not display the same changes in its free strain response, however. As can be seen from FIG. 4, the response changes very little from one day to the next. This is due to the fact that the ionic liquid is so much more stable than water. Thus, although in the present form there is some loss of strain caused by using ionic liquids as solvents instead of water, the advantage of long-term stability in air is achieved.

The electrochemical stability window of the ionic liquids and water was also studied. The electrochemical stability window defines the range of operating voltage below which there will be no degradation of the solvent. Typically, cyclic voltammetry is used to determine this range. The process is relatively straightforward: as the applied voltage to the solvent exceeds its stability limit, the current draw of the electrochemical cell noticeably increases. This is because the breakdown reaction of the solvent is consuming current; below the stability limit the current draw is due only to charging of the double layer created by the electrodes and the solvent (capacitive effect) and to the small leakage current through the solvent (resistive effect). The increase in current above the stability limit can be clearly seen on a cyclic voltammogram—see FIG. 5. This is a cyclic voltammogram of water for voltage limits from ±0.5 to ±1.5 V in 0.5 V increments; the voltage scan rate was 100 mV/sec.

Figure 5:
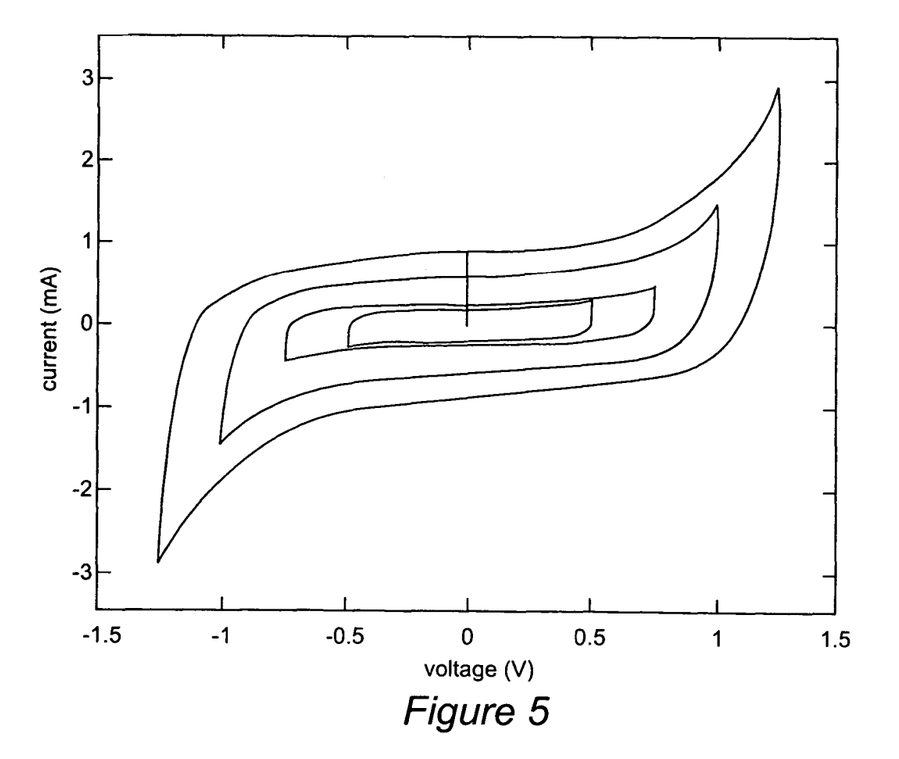
FIG. 5 is a cyclic voltammogram of water at a scan rate of 100 mV/sec.
Figure 6:
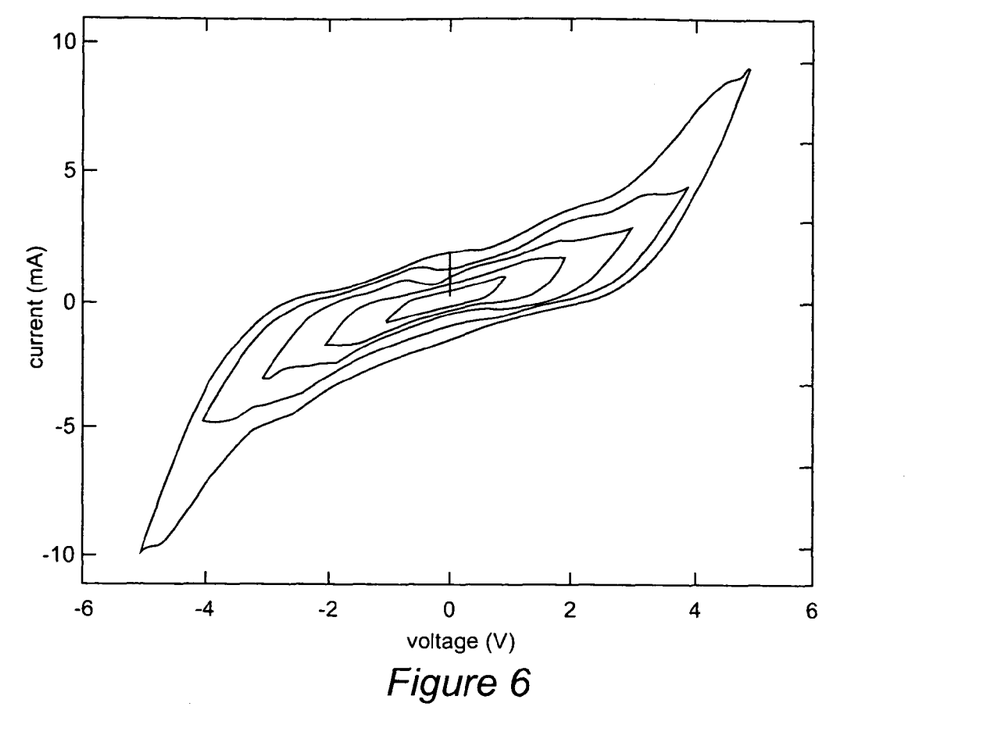
FIG. 6 is a cyclic voltammogram of an ionic liquid at a scan rate of 100 mV/sec.

As can be seen from FIG. 5, at voltages approaching and exceeding 1 V the current begins to rise exponentially. This sharp increase in the current is indicative of breakdown of the water, which can be problematic for ionic polymer transducers. The cyclic voltammogram of ionic liquid (TFSI anion) is shown in FIG. 6. From this figure it is evident that the ionic liquid is able to sustain much higher voltages before breakdown. The large increase in the current draw does not become apparent until the applied voltage exceeds 3 V. There are some unexplained artifacts of this plot. However, it is a compelling result in that it shows that an ionic polymer transducer solvated with this material could safely be driven at three times the voltage of the same material solvated with water, thus generating up to three times the mechanical energy.

A more comprehensive study was performed using 1-ethyl-3-methylimidazolium trifluoromethanesulfonate ionic liquid. This study involved fabricating a group of identical transducer samples and comparing the properties of these samples in the water form and the ionic liquid form. The transducers were prepared from Nafion 117 polymer membrane and chemically plated with gold. After the gold plating the polymer was soaked overnight in 0.5 M LiOH to exchange into the lithium ion form. Four strips of materials were then cut from the sheet, each 5 mm wide and 25 mm long. Two of these samples were tested in the water-solvated form and two were dehydrated and put into the ionic liquid form. The dehydration was done by baking the polymer samples in a vacuum oven at 85° C. and 25 torr for one hour. The dry samples were then sonicated in a solution of 70% (vol.) ionic liquid and 30% (vol.) methanol at 80° C. for one hour. Upon removal from the ionic liquid/methanol mixture the samples were blotted with a clean towel to remove residual solvent on surface.

Figure 7:
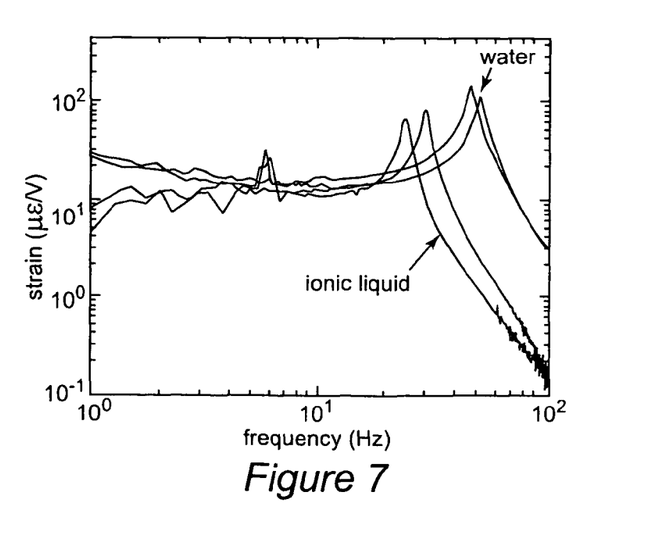
FIG. 7 is a graph showing the free strain frequency response of ionic liquid and water saturated ionic polymers.

Testing of these transducer samples involved measurement of four metrics: free displacement, elastic modulus, charge sensitivity, and electrical impedance; these metrics were all measured with the sample in a cantilevered position using either the laser vibrometer 14 of FIG. 2*a* or the electromagnetic shaker 16 and linear potentiometer 18 in conjunction with the load cell 20 of FIG. 2*b*. FIG. 7 is a plot of the free strain response of two samples of the gold-plated polymer in the water form and two samples in the ionic liquid form. As can be seen from the figure, the first resonant peak of the samples in the ionic liquid form occurs at a lower frequency than that of the water-solvated samples. This reduction in the resonant frequency is consistent with a reduction in the stiffness of the device and correlates with a reduction in the measured elastic modulus, from about 250 MPa in the water form to about 85 MPa in the ionic liquid form. In order to determine the amount of water and ionic liquid absorbed by the polymer, precise measurements of the weight of the dry and water- and ionic liquid-saturated transducers were made. Based on the weight measurements and the density of the solvents, the polymer absorbed 0.226 mL of water and 0.201 mL of ionic liquid per gram of dry polymer; these figures were arrived at by assuming that only water or ionic liquid was inside the polymer. However, volume measurements of the samples indicated that the ionic liquid samples were about 14% more swollen that the water samples, which is consistent with the lower modulus of the ionic liquid samples. This discrepancy is likely explained by the presence of residual methanol in the sample.

Figure 8:
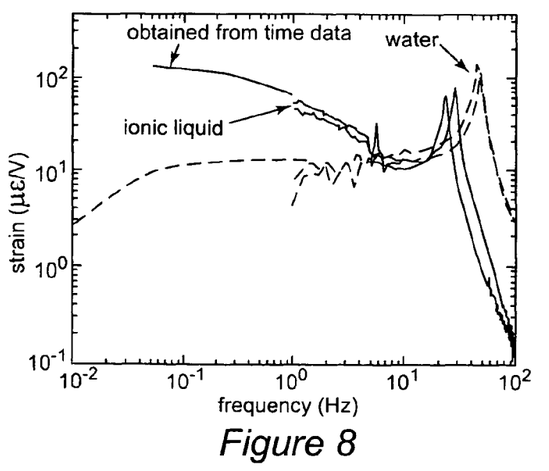
FIG. 8 is a graph showing the free strain frequency response of ionic liquid and water saturated ionic polymers which highlights differences at low frequencies.
Figure 9A:
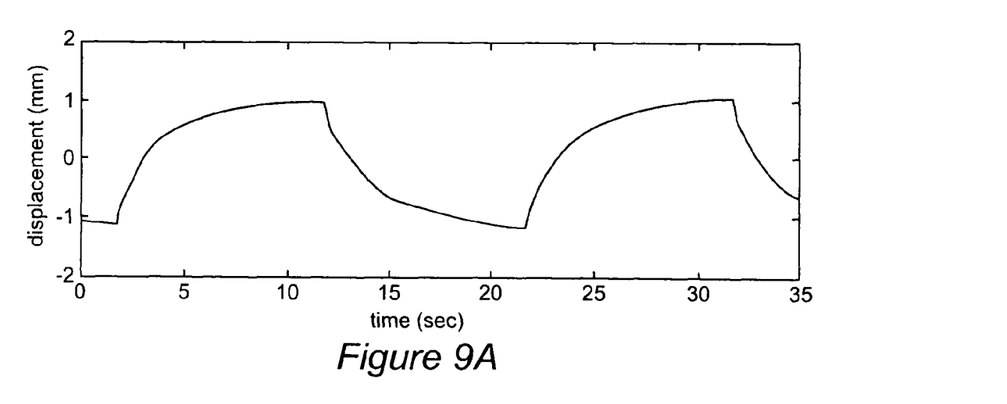
FIGS. 9a and 9b show the free cantilever time responses of (a) a sample in the ionic liquid form to a 3.5 V square wave input, and (b) a sample in the water form to a 1.5 V square wave input.
Figure 9B:
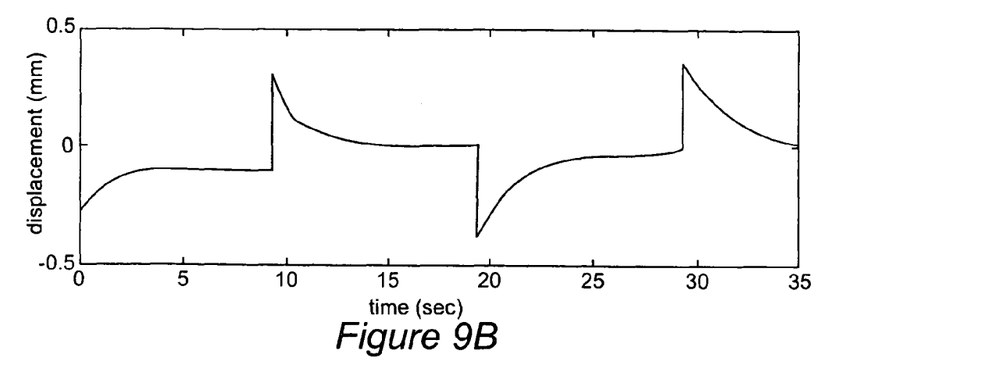

Another interesting characteristic of the free strain response of these materials is the large difference in the strain at low frequencies. FIG. 8 shows the low frequency response of the ionic liquid samples was determined from time response data; the low frequency response of the water samples is a representative fit inferred from the step response but is intended only for reference. The ionic liquid samples seem to display a higher strain response at low frequencies than the hydrated samples. Typically, ionomeric transducers solvated with water are hindered at low frequencies by a characteristic relaxation in the material. However, the ionic liquids do not exhibit this relaxation and in fact generate larger strains at low frequencies. Based on this data, a reasonable explanation is that the strain generated by the ionic liquid samples at higher frequencies is limited by the speed of the ionic diffusion within the polymer. This difference can also be seen in low frequency square wave responses of the two materials as shown in FIGS. 9*a* and *b*. As can be seen, the ionic liquid sample has a much slower rise time than the water sample, but does not exhibit relaxation in the response. Similar phenomena have been observed by Onishi et al. in Flemionrm polymers and by Nemat-Nasser and Wu in Nafion™ polymers when using mobile cations of different sizes (see, Onishi, K., Sewa, S., Asaka, K., Fujiwara, N., and Oguro, K., 2001. "The Effects of Counter Ions on Characterization and Performance of a Solid Polymer Electrolyte Actuation" *Electrochimica Acta*, 46, pp. 1233-1241, and Nemat-Nasser, S. and Wu, Y., 2003. "Comparitive Experimental Study of Ionic Polymer-Metal Composites with Different Backbone Ionomers and in Various Cation Forms" *Journal of Applied Physics*, 93, pp. 5255-5267). This slower behavior of the ionic liquid samples is similar to the responses of water-solvated samples in the tetrabutylammonium ion form and is likely due to the large and bulky 1-ethyl-3-methylimidazolium cation in the ionic liquid.

Figure 10:
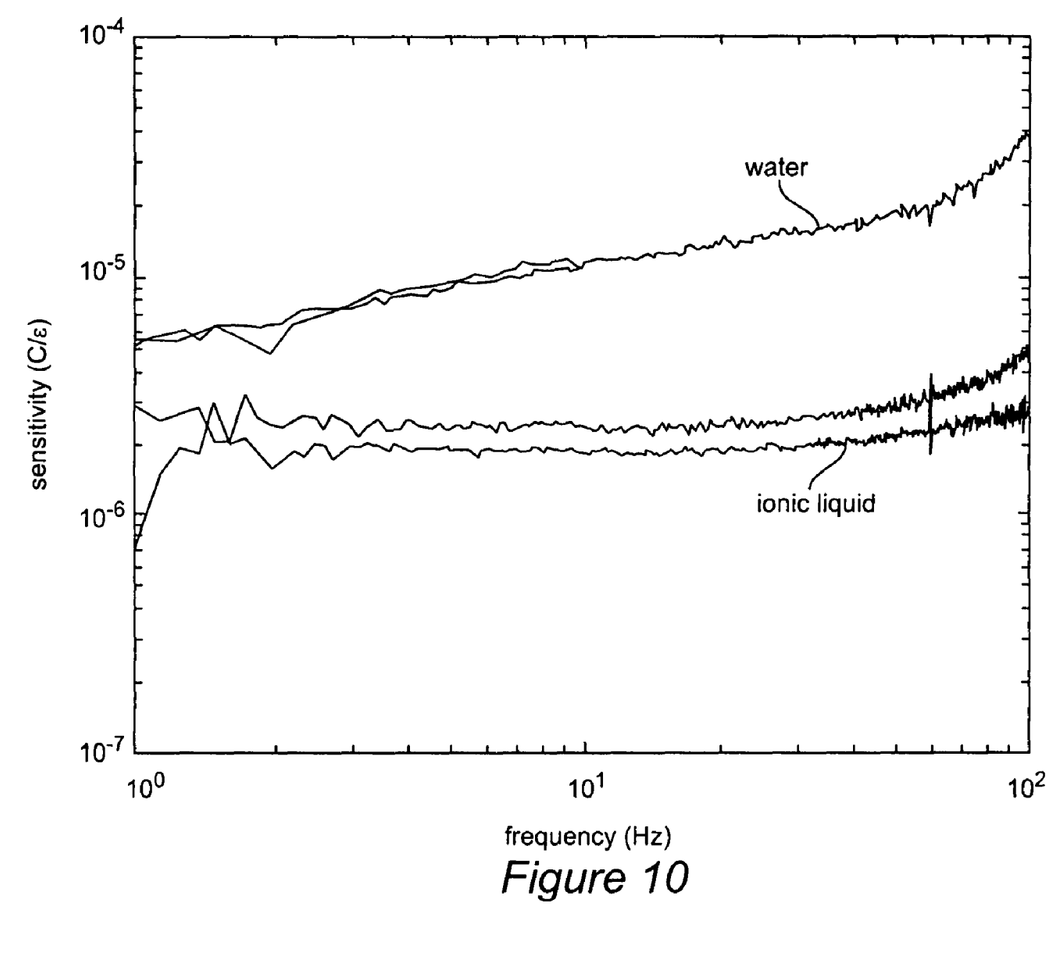
FIG. 10 is a charge-to-strain sensing response of samples in the water and ionic liquid form.
Figure 11:
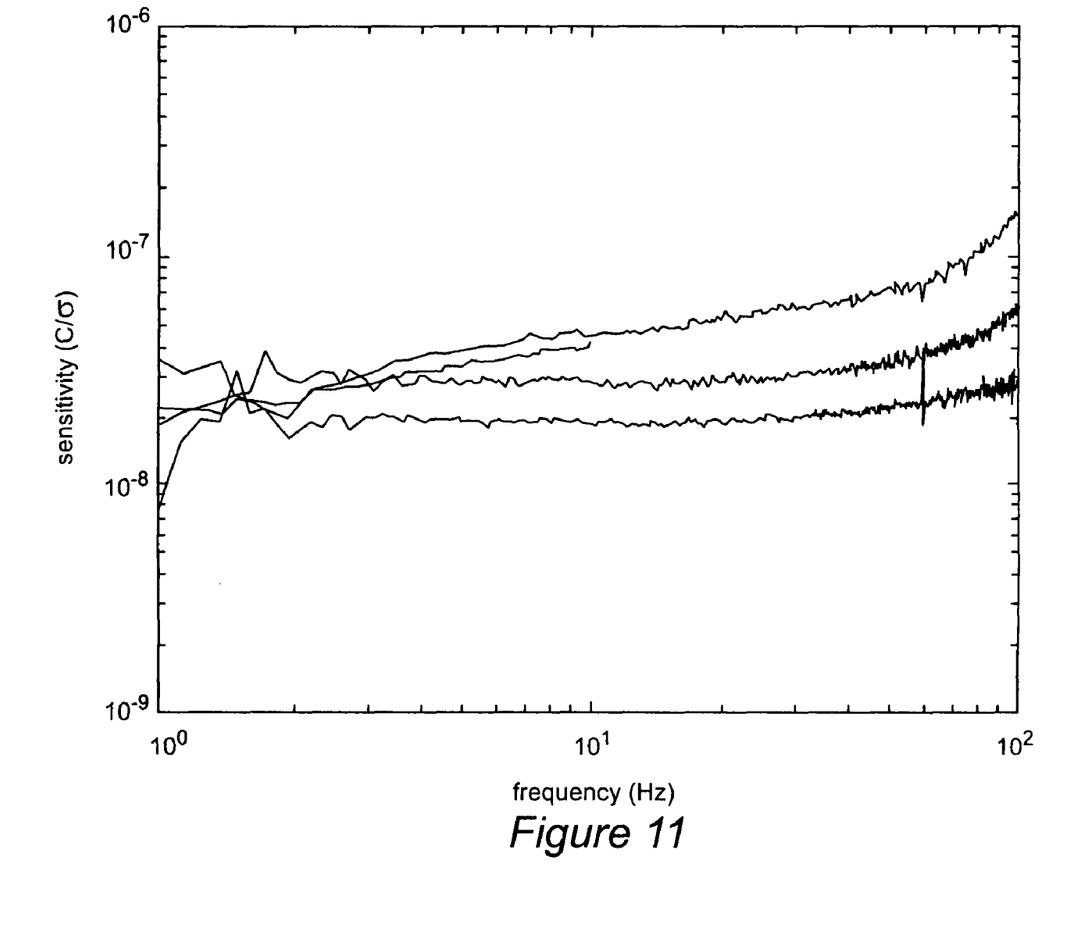
FIG. 11 is a graph showing the charge-to-stress sensing response in the water and ionic liquid form.

Also characterized was the sensing response of these polymers as displacement transducers (see FIG. 2*b* for an experimental set up). Previous work has shown that ionic polymer membranes generate a charge in response to an induced stress or strain in the material. FIG. 10 shows a frequency response of the charge output to induced strain in the water-and ionic liquid-solvated samples. As can be seen in the figure, the charge sensitivity of the water-solvated samples is higher than that of the ionic liquid-solvated samples. However, the water samples have a higher elastic modulus than the ionic liquid samples. When the sensing data is adjusted for the difference in the modulus and plotted as charge-per-stress, the responses agree more closely—see FIG. 11. This would seem to indicate that the fundamental sensing mechanism in these polymers is stress induced and not strain induced. Also, the effect of frequency on the sensing data is not as pronounced as in the free strain data.

EXAMPLE 1

The five ionic liquids used in the current study are comprised of substituted phoshonium or pyrrolidinuim cations and either the bis(trifluoromethylsulfonyl)imide anion or the tris(pentafluoroethyl)trifluorophosphate anion. Also studied was the more common 1-ethyl-3-methylimidazolium cation with the trifluoromethanesulfonate (triflate) anion. A listing of these ionic liquids and their identification numbers to be used in this paper are given in Table 1.

TABLE 1

| ID # | Ionic Liquid |
|---|---|
| 1 | trihexyl(tetradecyl)phosphonium bis(trifluoromethylsulfonyl)imide |
| 2 | trihexyl(tetradecyl)phosphonium tris(pentafluoroethyl)trifluorophosphate |
| 3 | 1-butyl-1-methyl-pyrrolidinium bis(trifluoromethylsulfonyl)imide |
| 4 | 1-butyl-1-methyl-pyrrolidinium tris(pentafluoroethyl)trifluorophosphate |
| 5 | 1-ethyl-3-methyl-imadazolium trifluoromethanesulfonate |

These five ionic liquids were studied for their ability to swell the plated perfluorosulfonic acid (e.g., Nafion™) membrane by monitoring the weight uptake and Young's modulus of the samples periodically during the incorporation process. The modulus is measured by deforming the tip of a cantilevered sample and measuring the resulting deflection and reaction force. This is then used to compute the bending stiffness and ultimately the elastic modulus. The volume of solvent in the samples was computed by measuring the difference in the solvated weight of the membrane and the dry weight and dividing this weight uptake by the measured density of the ionic liquids. It was determined that the modulus of the Nafion membrane is inversely proportional to the volume fraction of solvent in the membrane and this relationship is independent of solvent. Furthermore, the relationship between modulus and degree of solvation obeyed the −4/3 power law.

In order to probe the internal structure of the Nafion-117 membranes with the ionic liquid solvents, Small-Angle X-Ray Scattering (SAXS) testing was performed. SAXS testing of polymers is useful for making determinations of long-range order in the polymer matrix. In the case of Nafion, SAXS testing is useful for investigating the cluster morphology of the polymer, specifically the spacing between the clusters and the regularity of the spacing. The samples with the ionic liquids all showed some ordering in the polymer. It was found that the degree of order was the least for the phosphonium ionic liquids, numbers IL 1 and IL 2 of Table 1, which also have the largest degree of swelling (46% for IL 1 and 54% for IL 2, as a percentage of the total swollen volume). The substituted pyrrolidinium salts exhibited more order and are less swollen than the phosphonium salts (13% for IL 3 and 24% for IL 4). The mean center-to-center cluster spacing in these two samples was very similar and on the order of 30 angstroms. The imidazolium-based ionic liquid sample contained 32% ionic liquid by volume and its relative order fell between the other two groups of samples. The mean cluster spacing in this sample was 50 angstroms. These results indicate that long-range order in the form of ionic clusters is present in these ionic liquid-solvated membranes as in water-solvated membranes and that both the range and degree of this order are related to the solvent uptake by the membrane.

In order to determine the effectiveness of using ionic liquids as solvents for ionic polymer transducers, a characterization of the samples made in the current study was performed. Ionic polymer transducers are known to operate as distributed bending actuators and sensors. Furthermore, the capacitance of these devices has been shown to be strongly linked to their performance as transducers. For this reason, the charge sensing response as well as the strain-to-voltage and strain-to-charge actuation responses and the electrical impedance and capacitance of these samples was measured.

The free tip displacement of cantilevered samples 5 mm wide with a 13 mm free length were measured up to 100 Hz using a non-contact laser vibrometer (an example being shown in FIG. 2a). This displacement was then used to compute the strain in the samples by assuming that the sample deforms with a constant curvature. In equation 1, $\epsilon$ is strain, $\delta$ is tip deflection, t is the membrane thickness, and L is the free length of the sample.

$$\epsilon = (\delta t)/L^2 \qquad \text{Eq. 1}$$

All of these samples were in the proton counterion form and were rinsed to ensure the absence of any excess free electrolyte. The samples with the ionic liquid exhibited strikingly different frequency responses than the water sample. One reason for the differences may be the high viscosity of the ionic liquids. The viscosities of the five ionic liquids that were used in this study are summarized in Table 2. Also presented are the measured densities of the ionic liquids and the densities and viscosities available from the literature. The reasons for the discrepancies in the measured values and those from the literature are unknown, but could be due to the presence of impurities in the ionic liquid used for the current study.

TABLE 2

| ID# | viscosity (cP)@ 298K | density (g/mL) | melting point (K) | specific conductivity (mS/cm) | volume percent solvent (%) | Young's modulus (Mpa) |
|---|---|---|---|---|---|---|
| 1 | 322 | 1.083 | — | — | 45.8 | 14.7 |
| 2 | 348 | 1.171 | — | — | 54.0 | 3.6 |
| 3 | 76 | 1.396 | — | — | 15.4 | 246.6 |
| 4 | 224 | 1.598 | — | — | 23.7 | 197.3 |
| 5 | 35, 45, 43 | 1.321, 1.390, 1.383 | 264, 263 | 8.6 9.3 | 32.5 | 152.9 |
| Water | 1 | 1 | 273 | — | 45.0 | 63.2 |

High frequency data was collected with a Fourier analyzer with a random voltage input signal to the polymer. In order to obtain accurate low frequency strain data, the response of the polymer to single frequency inputs was also measured. Data was not collected for ionic liquids 1 and 2 because of the very large volume percents of these solvents in the swollen membrane, which led to highly cracked electrodes and a loss of surface conductivity, as well as a very low elastic modulus.

From the viscosity and the high frequency data it was determined that the higher viscosity of the ionic liquids limits the diffusion of ions within the polymer membrane, leading to a decline in the strain response at higher frequencies. This is especially evident in ionic liquid number 4 (IL #4). The reason for the small response in the sample solvated with IL #3 is the small volume fraction of solvent in the membrane and the corresponding high modulus and low ionic conductivity. Even in the least viscous ionic liquid the limited mobility of the ions is evident, although this effect manifests itself at higher frequencies than in the other two samples. From these results it seems that IL #5 possesses an appropriate combination of low viscosity and intermediate swelling that will lead to desirable transduction in ionic polymer actuators, and may be preferred in a number of applications. Furthermore, this ionic liquid has an electrochemical stability window of 4.1 V as compared to about 1.2 V for pure water. This means that these actuators can be driven at higher voltages without degradation of the solvent, leading to higher available energy output. This ionic liquid has also been shown to be thermally stable up to 400° C. In the proton form, the sample solvated with this ionic liquid actually demonstrated higher induced strains than the water sample, with the advantages of about twice the electromechanical stability window and negligible vapor pressure at room temperature.

Because the transduction in these materials is driven by the motion of the mobile charges, a more elegant way to interpret these results is to measure the generated strain per unit charge (per unit area) into the polymer sample. Graphical analysis showed that the strain-to-charge response for all of the samples is constant as a function of frequency up to the mechanical resonance of the sample. This indicates that although some of the samples exhibit a very small electromechanical response, the attenuation is due to low charge mobility in the polymer, not a reduction in the fundamental coupling mechanism. This reduced charge mobility is likely due to the higher viscosity of the ionic liquids and the lower volume percent of solvent, both of these effects leading to a reduction in the ionic conductivity of the solvent/polymer composite. Perhaps most interesting is the fact that the sample solvated with water demonstrated the least coupling between charge and strain. This likely indicates that although the protons in this sample are very mobile, leading to high capacitance, they are not very large in size, and thus when displaced do not generate significant strain in the polymer. Furthermore, the mobility of the protons seems to decrease with increasing frequency, as was evidenced by the decay in the free strain response and capacitance. It is unusual that the water-swollen sample had a higher capacitance than the ionic liquid samples but exhibits a lower strain response. This result would seem to suggest that the ions in the ionic liquid may be playing a role in the actuation.

Testing with the imidazolium ionic liquid number 5 (IL #5) was also performed on samples in the lithium counterion form. The lithium sample in the water-swollen form exhibits a strain response an order of magnitude larger than the water sample in the proton form. The ionic liquid sample in the lithium form has almost exactly the same response as in the proton form, however.

The capacitance of the water sample was determined to be much larger than the ionic liquid sample and if the strain was normalized by charge, the responses become remarkably similar. Again, this seems to indicate that although the mobility of the charges is reduced in the ionic liquid, the generated strain is related directly to the displacement of those charges.

Also, the samples solvated with IL #5 had nearly identical strain and capacitance responses in both the proton and lithium ion form and had very similar volume fractions of solvent (32.5% for $H^+$ and 36.8% for $Li^+$). However, a large difference in the strain and capacitance curves was observed between the two ionic forms of the water-solvated samples, which were swollen 45.0% in the $H^+$ form and 51.7% in the $Li^+$ form. This difference is due to the fact that the lithium ion forms a large solvation shell in water, increasing its size dramatically as compared to the proton. However, it appears that this solvation shell is not present in the ionic liquid or Nafion membrane samples, as the volume percent solvent and the response curves between the two ionic forms are very similar, indicating that the sizes of the ions in these two samples are very similar.

The time-domain responses of these samples to step voltage inputs were also measured. The samples that were solvated with water exhibited a characteristic back relaxation that is larger in magnitude than the initial response of the device. This back relaxation is problematic for applications where DC positioning with ionic polymer transducers is required. The ionic liquid samples did not exhibit this relaxation phenomenon.

There was also a difference in the speed of the responses. The water samples had a very small rise time in response to a step, which is characteristic of the low solvent viscosity and corresponding high ionic mobility in these samples. The samples in IL5 had a slightly longer rise time, but still reach their peak within 500 ms. The samples in ILs 3 and 4 have very long rise times and are still deforming at 250 s. This slow response was also evident in the frequency responses of these samples and is associated with limited ion mobility and decay in the response with increasing frequency.

The sensing responses of the transducer samples solvated with water and ionic liquids was also characterized. The sensing response of the samples in ionic liquids 3 and 4 (ILs 3 and 4) were very similar, much like their free strain responses. Also, the sensing response of the samples in ionic liquid 5 (IL #5) seemed to be independent of the cation, which is consistent with its strain response. The sensing response of the samples in the water form appeared less sensitive to the cation than the strain response of the samples. Also, the response of the proton-form sample decreased at higher frequencies, which was also observed in its free strain and capacitance responses.

Finally, the stability of one of the ionic liquid-solvated transducers was evaluated by driving the sample continuously in air with a 1.5 V (peak), 2 Hz sine input and monitoring the tip displacement with a high-speed camera. Although the tip displacement decreased gradually over the course of the test, the strain after 250,000 cycles was still 75% of the initial value. This decrease in displacement was accompanied by a darkening of the electrodes. Two possible explanations for this behavior are decomposition of impurities in the ionic liquid and absorption of water by the hygroscopic Nafion™ polymer or the ionic liquid, which is miscible with water. Although the actuation performance of this sample did not match its water-swollen counterpart, the air stability of this device represents a drastic improvement over water.

In this example, ionic liquids have been demonstrated as viable solvents for ionic polymer transducers. Actuation responses of $200 \mu\epsilon/V$ have been achieved using the ionic liquid 1-ethyl-3-methylimidazolium trifluoromethanesulfonate. This ionic liquid is has a melting point of $-10°$ C., an electrochemical stability window of 4.1 V, and no measurable vapor pressure. The low viscosity and favorable swelling properties of this ionic liquid also make it well-suited for use in ionic polymer actuators and sensors. Charge sensitivity of the ionic liquid samples is on the order of $50 \mu C/\epsilon$. The long-term air stability of transducers solvated with ionic liquids demonstrated that transduction in these materials is directly related to motion of charges in the polymer regardless of the nature of the solvent. The possibility exists that the constitutive ions in the ionic liquid are playing a role in the transduction.

EXAMPLE 2

In order to overcome the problem of dehydration and electrode stability, a new method for fabricating ionic transducers, sensors and/or actuators has been developed that combines the use of ionic liquids and metal powder painted electrodes in the same device. In this method, a bare ionic polymer membrane, such as a Nafion membrane, is first exchanged from the proton counterion form into one of the alkali metal (e.g., Na+, Li+) forms. This is to prevent charring of the membrane during the drying step, which has been witnessed when Nafion membranes in the acid form are heated for extended periods of time. After ion exchange, the membrane is dried in an oven at 150° C. under vacuum for 12 hours. The dry membrane is then immersed in neat 1-ethyl-3-methyimidazolium trifluoromethanesulfonate (EmI-Tf) ionic liquid and heated to 150° C. for 4.5 hours. The uptake of ionic liquid during the immersion step is 60% by the dry weight of the membrane.

After the ionic liquid has been imbibed into the membrane, the electrodes are applied using the metal powder painting technique. A polymer/metal solution is prepared containing 47% (by weight) of 5% Nafion solution, 47% glycerol, and 6% $RuO_2$ powder (particle size 3 to 5 nm). This solution is painted directly onto each surface of the ionic liquid-containing Nafion membrane. The glycerol and alcohol solvents (in the Nafion solution) are removed by baking the membrane at 130° C. under vacuum for 15 minutes between each electrode layer; a total of four layers are applied to each side of the membrane. Following the electrode painting process, the membrane is dried at 130° C. under vacuum for an additional 10 minutes to ensure complete removal of all volatile components from the composite. Based on the weight change of the membranes, the loading of ruthenium dioxide is estimated to be around 3-5 $mg/cm2$ of membrane area. After the ruthenium dioxide layers have been painted onto the surfaces of the membrane and dried, the three layers of the composite are intimately bound together by a hot-pressing process. This hot-pressing was carried out at 4 MPa and 210° C. for 20 seconds. After the hot-pressing, the composite is placed back into the EmI-Tf ionic liquid to allow the ionic liquid to saturate the newly formed electrode layers. This saturation is carried out at 130° C. for 1.5 hours. At this point the membrane is ready to be used as an electromechanical transducer. However, the surface conductivity of the $RuO_2$ layers is not high enough to allow for effective charging of the device. In order to decrease the surface resistance from greater than 100 kW/cm to less than 1 W/cm, the surfaces of the membrane are painted with an air-drying silver conductive paint.

Figure 12:
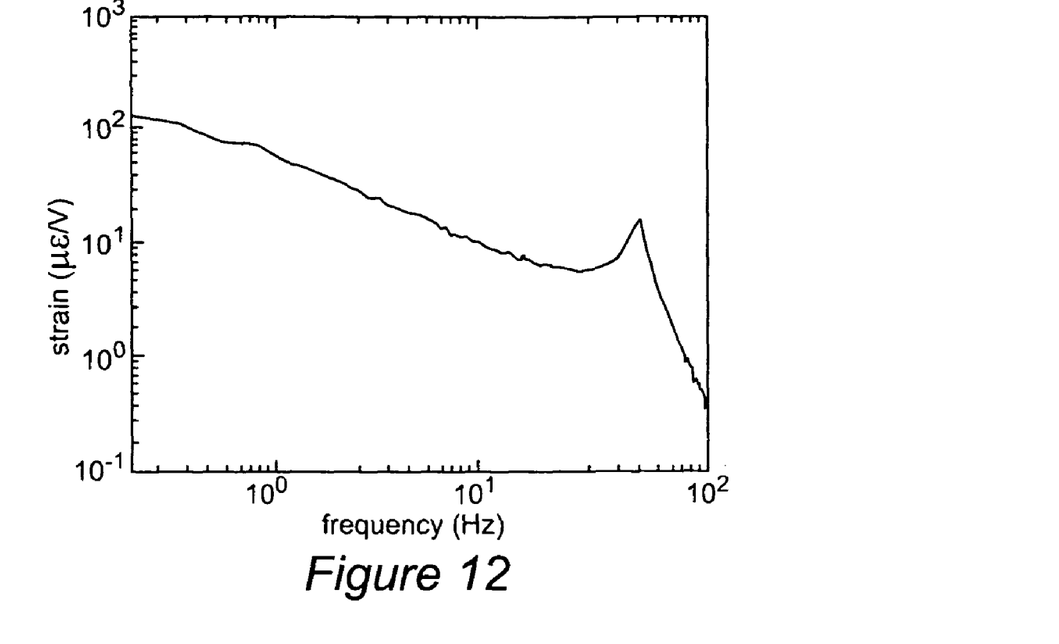
FIG. 12 is a graph showing the strain response of a sample made by first imbibing the ionic liquid into the ionic polymer, and then applying a metal powder electrode.

The membranes prepared in this way are tested for their free strain generation in the time and frequency domains and their elastic modulus. As can be seen in FIG. 12, the ability of the sample to generate strain at high frequencies is limited by the mobility of the mobile charges, likely in the ruthenium dioxide layer. Probably the more dominant reason for the slow response is the low electrical conductivity of ruthenium dioxide as compared to platinum. This will create a high resistance through the thickness of the electrode and reduce the ability of charge to diffuse into this region.

Figure 13:
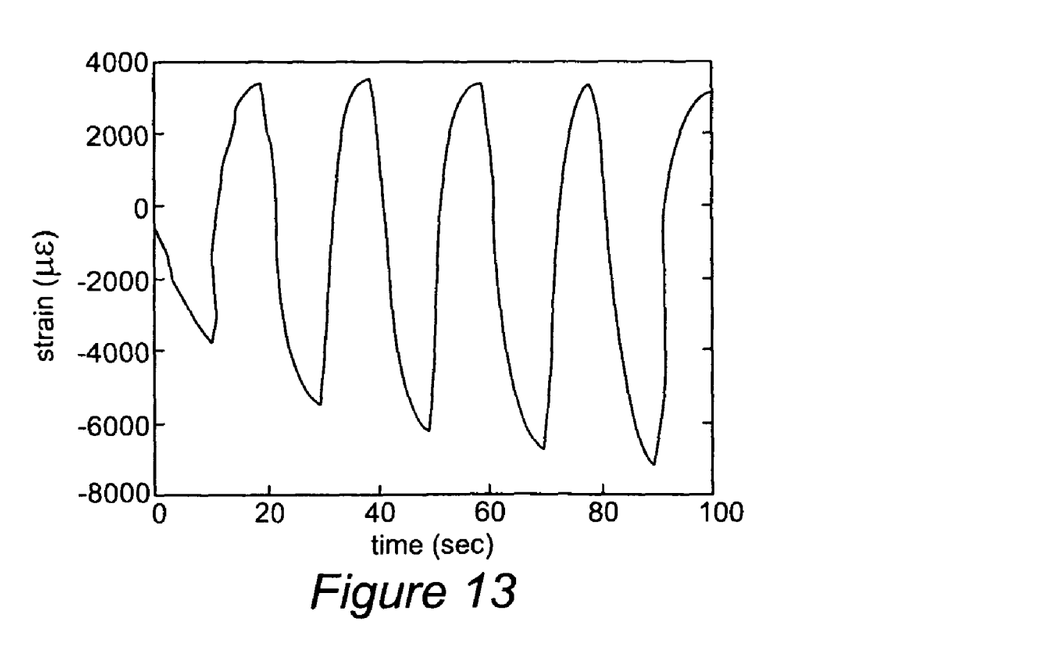
FIG. 13 is a graph showing the time response of a sample made by first imbibing the ionic liquid into the ionic polymer and then applying a metal powder electrode to a 2.0 V, 0.05 Hz square wave input.

At sufficiently low frequencies significant strains can be generated, however. FIG. 13 shows the time response of this sample to a 2 V, 0.05 Hz square wave input. As can be seen, the maximum strain generated in the sample is more than 1.0% peak-to-peak for a ±2.0 V input. Also, there is no characteristic back relaxation observed in the response. The sample containing the ionic liquid can be driven at a higher voltage because the electrochemical stability window of the ionic liquid is larger than that of water. Bonhôte et al., and Cooper and Sullivan have reported that the electrochemical stability window of EmI-Tf ionic liquid is 4.1 V.

The elastic modulus of the composite is measured to be around 100 MPa, which is low as compared to samples made using the traditional impregnation/reduction method and solvated with water. The traditional platinum-plated and water-solvated samples have an elastic modulus on the order of 250 MPa; the reason for the low modulus of the new sample is the large amount of ionic liquid present in the sample. Additionally, the capacitance of this sample was measured to be 16.9 mF/cm2 at 1 Hz, while at lower frequencies the capacitance increases to approximately 60 mF/cm2. The maximum membrane capacitance that can be obtained when using the impregnation/reduction method and water solvent is about 5 mF/cm2. The main advantage of this new method is the ability to vary many of the fabrication parameters independently. Because such things as which ionic liquid is used, the amount of ionic liquid in the membrane, the size and type of metal powder used, and the number of electrode layers can be controlled precisely and independently, this new method provides the opportunity to optimize these transducers to achieve the maximum performance and to be suited to specific applications. The main advantage is that because the electrode is now applied after the ionic liquid has been imbibed into the Nafion membrane, the problem of electrode stability is eliminated and the design space is expanded to include a much broader range of parameter combinations.

While the invention has been described in terms of its preferred embodiments, those skilled in the art will recognize that the invention can be practiced with modification within the spirit and scope of the appended claims.

Having thus described our invention, what we claim as new and desire to secure by Letters Patent is as follows:

1. A transducer, actuator or sensor, comprising:
    an ionic polymer membrane having at least a first ion selected from the group consisting of cations and anions covalently bonded to said ionic polymer membrane, and wherein said at least a first ion can ionically interact with a second ion which is not bonded to said ionic polymer membrane;
    electrodes adhered to opposite sides of said ionic polymer membrane; and
    an ionic liquid positioned in said ionic polymer membrane, wherein said ionic polymer membrane is configured to permit deformation.

2. The transducer, actuator or sensor of claim 1 wherein said ionic polymer membrane is comprised of a perfluorosulfonic acid polymer.

3. The transducer, actuator or sensor of claim 1 wherein said ionic liquid is selected from the group consisting of substituted or unsubstituted pyridinium compounds, pyridazinium compounds, pyrimidinium compounds, pyrazonium compounds, imadazolium compounds, pyrazolium compounds, thiazolium compounds, oxazolium compounds, and triazolium compounds.

4. The transducer, actuator or sensor of claim 1 wherein the ionic liquid is 1-ethyl-3-methylimidazolium trifluoromethanesulfonate.

5. The transducer, actuator or sensor of claim 1 wherein said electrodes are formed from a conductive powder and ionomer solution.

6. The transducer, actuator or sensor of claim 1 further comprising an input voltage which is applied to said electrodes to cause said ionic polymer membrane to deform.

7. The transducer, actuator or sensor of claim 1, further comprising a means for measuring a charge in said ionic polymer member due to deformation.

8. The transducer, actuator or sensor of claim 1 wherein said ionic polymer membrane is in a cantilevered configuration which permits a tip end to flex.

* * * * *